United States Patent
Doi et al.

(10) Patent No.: US 12,186,972 B2
(45) Date of Patent: Jan. 7, 2025

(54) ROLL MOLD AND MANUFACTURING METHOD THEREFOR, AND TRANSFER SHEET

(71) Applicant: Dexerials Corporation, Shimotsuke (JP)

(72) Inventors: Katsuhiro Doi, Shimotsuke (JP); Kazuhiko Noda, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 199 days.

(21) Appl. No.: 17/907,671

(22) PCT Filed: Apr. 5, 2021

(86) PCT No.: PCT/JP2021/014492
§ 371 (c)(1),
(2) Date: Sep. 29, 2022

(87) PCT Pub. No.: WO2021/206052
PCT Pub. Date: Oct. 14, 2021

(65) Prior Publication Data
US 2023/0126879 A1 Apr. 27, 2023

(30) Foreign Application Priority Data
Apr. 8, 2020 (JP) .................. 2020-070044

(51) Int. Cl.
*B29C 59/04* (2006.01)
*B29C 33/42* (2006.01)
*B29C 33/38* (2006.01)

(52) U.S. Cl.
CPC .............. *B29C 59/04* (2013.01); *B29C 33/42* (2013.01); *B29C 33/3842* (2013.01)

(58) Field of Classification Search
CPC ....... B29C 59/04; B29C 33/42; B29C 33/424; B29C 33/3842
See application file for complete search history.

(56) References Cited

U.S. PATENT DOCUMENTS

2003/0218400 A1* 11/2003 Rimmel ................ H02K 17/20
310/211
2004/0112561 A1* 6/2004 Watanabe ............. D21F 3/086
162/358.3

FOREIGN PATENT DOCUMENTS

JP 2001301029 A 10/2001
JP 2004151704 A 5/2004
(Continued)

OTHER PUBLICATIONS

Dec. 26, 2023, Notification of Reasons for Refusal issued by the Japan Patent Office in the corresponding Japanese Patent Application No. 2022-171736.
(Continued)

*Primary Examiner* — Jerzi H Moreno Hernandez
(74) *Attorney, Agent, or Firm* — KENJA IP LAW PC

(57) ABSTRACT

Provided is a roll mold that has a plurality of linear grooves arranged side by side on its outer peripheral surface and in which an optical step between adjacent linear grooves is sufficiently small. A roll mold comprising, on an outer peripheral surface thereof, n linear grooves extending in a roll axial direction or a direction inclined with respect to the roll axial direction and arranged side by side, where n is 800 or more, wherein the n linear grooves are arranged in a manner that a gradual decrease and a gradual increase in groove depth are repeated, and the number of points at which a transition from the decrease to the increase in groove depth occurs is m or less, where m is selected from 2 to 8.

4 Claims, 9 Drawing Sheets

(56) References Cited

FOREIGN PATENT DOCUMENTS

| JP | 2007301647 A |   | 11/2007 |
|----|--------------|---|---------|
| JP | 2009164103 A |   | 7/2009  |
| JP | 2013202953 A | * | 10/2013 |
| JP | 2014044912 A |   | 3/2014  |

OTHER PUBLICATIONS

Jul. 19, 2022, Notification of Reasons for Refusal issued by the Japan Patent Office in the corresponding Japanese Patent Application No. 2020-070044.
May 11, 2021, International Search Report issued in the International Patent Application No. PCT/JP2021/014492.
Oct. 6, 2022, International Preliminary Report on Patentability issued in the International Patent Application No. PCT/JP2021/014492.
Oct. 22, 2024, Office Action issued by the Taiwan Intellectual Property Office in the corresponding Taiwanese Patent Application No. 110112715.

* cited by examiner

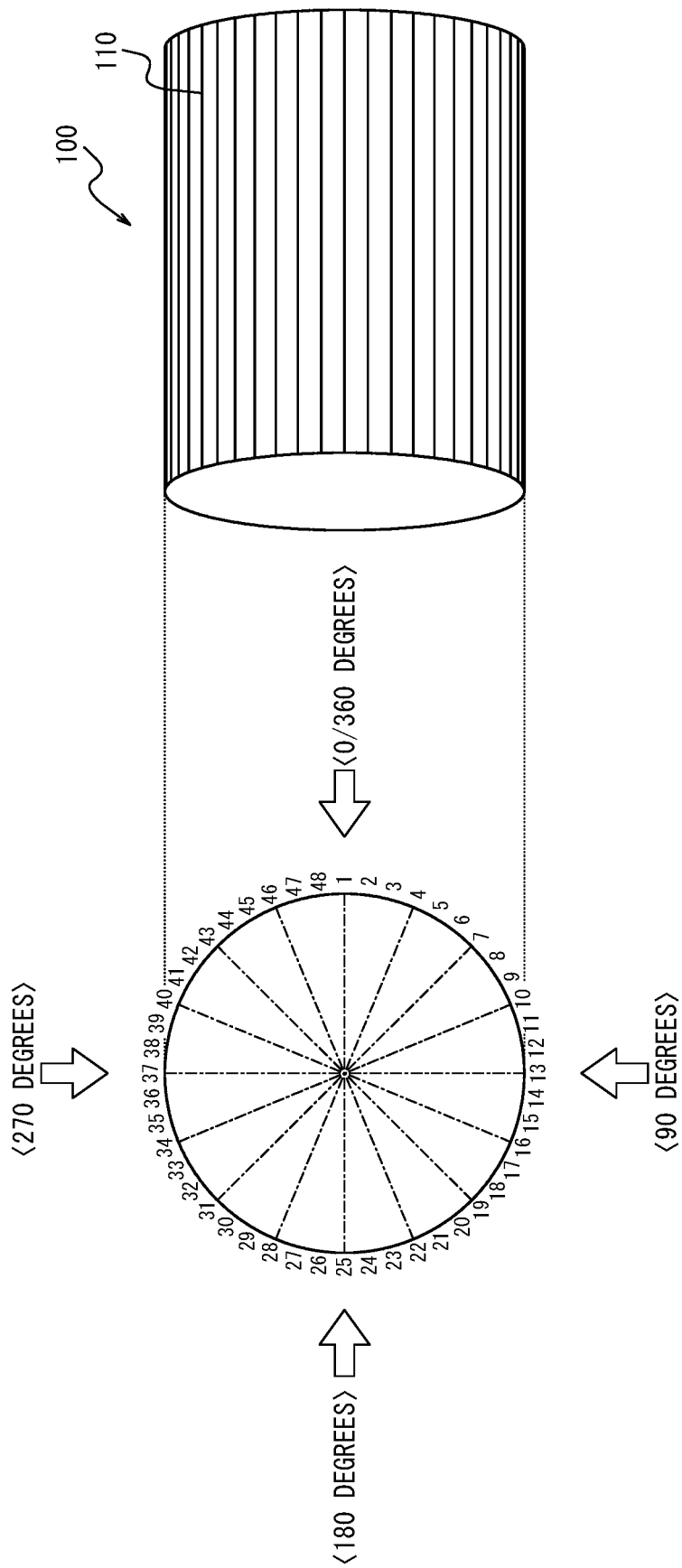

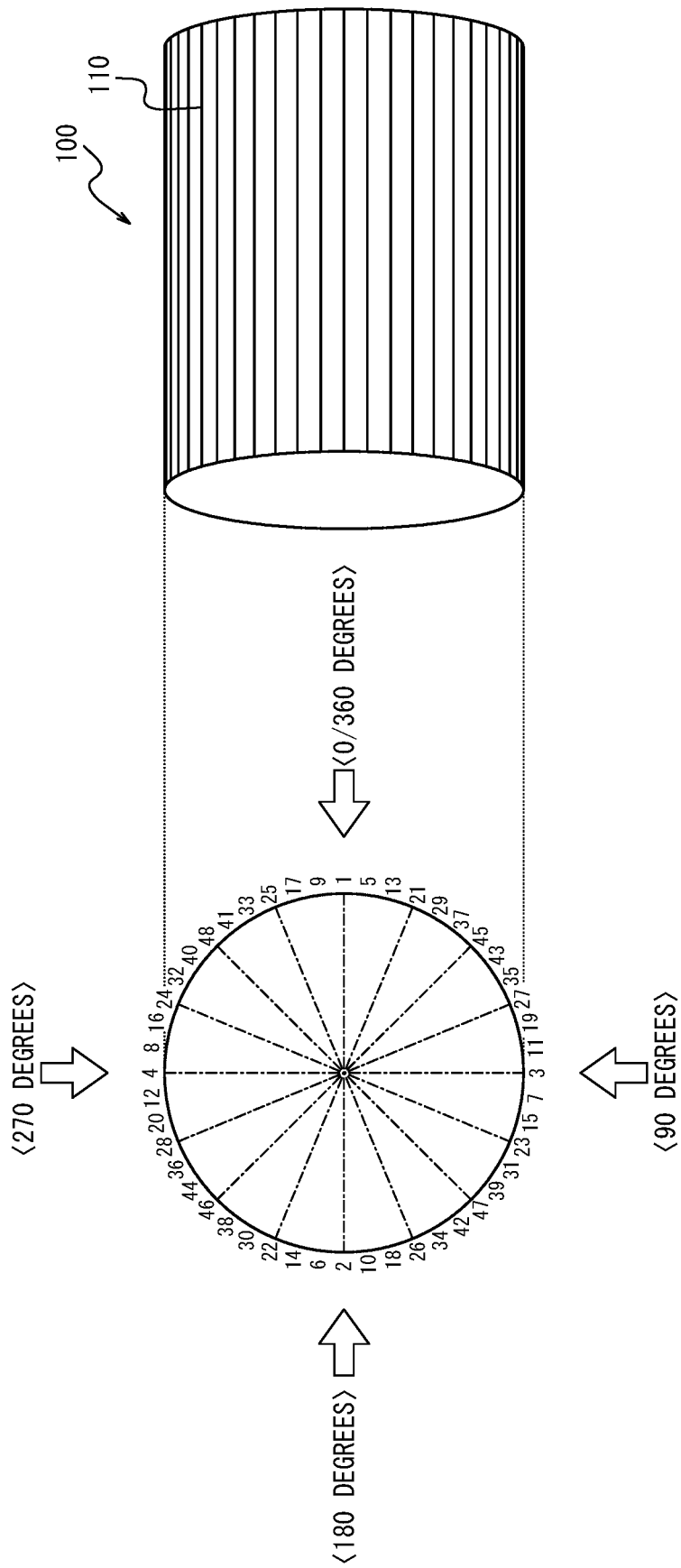

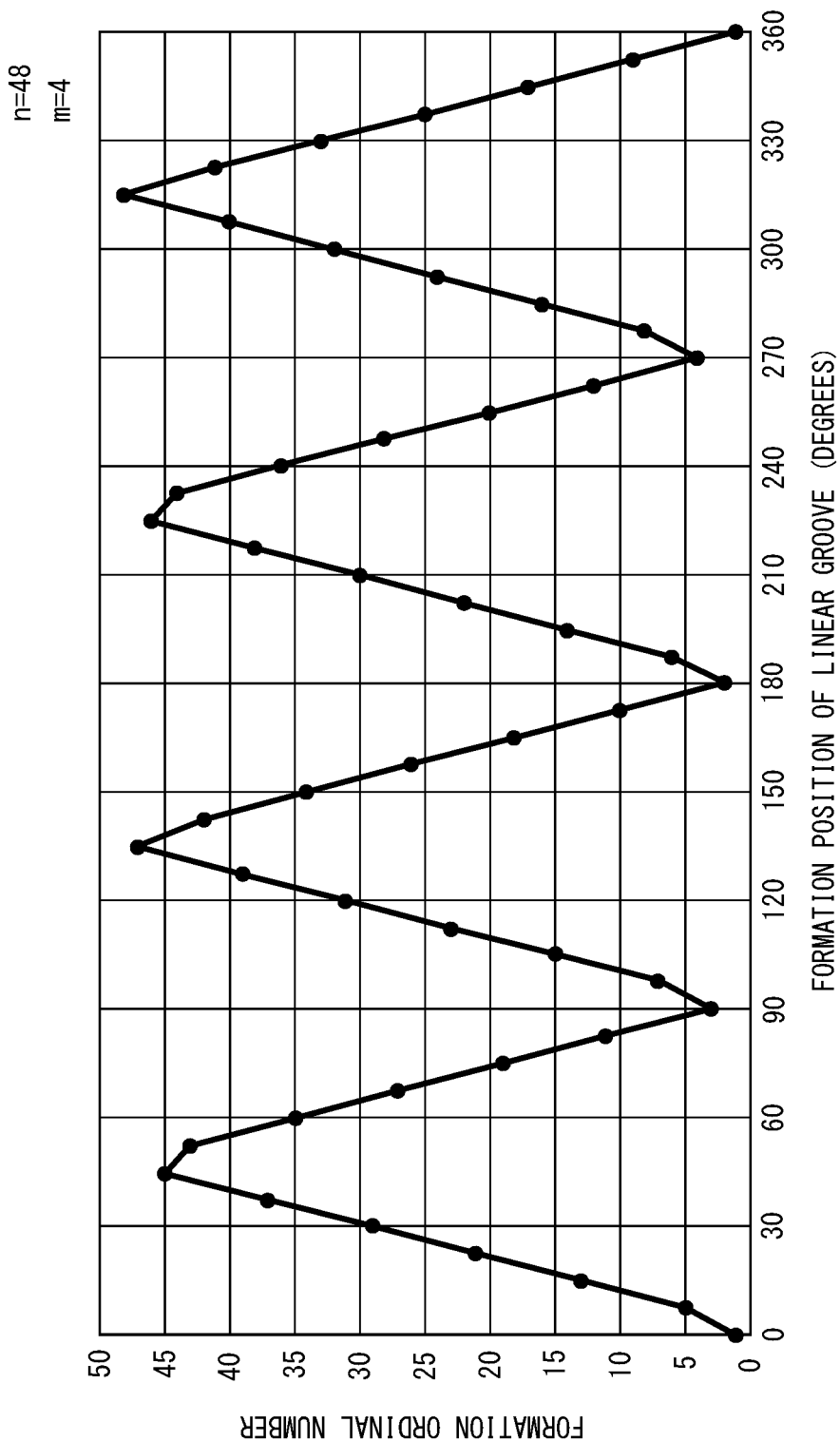

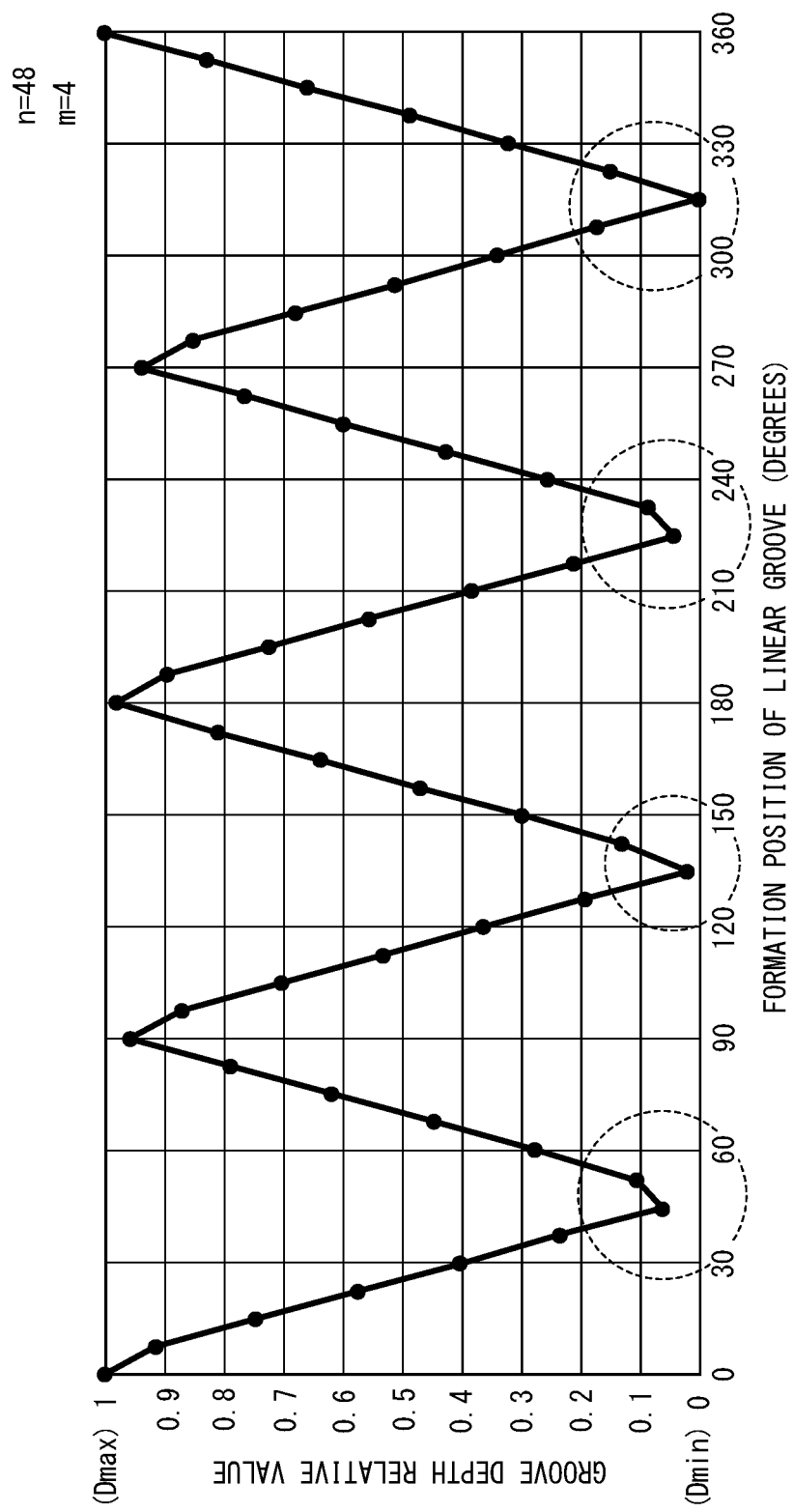

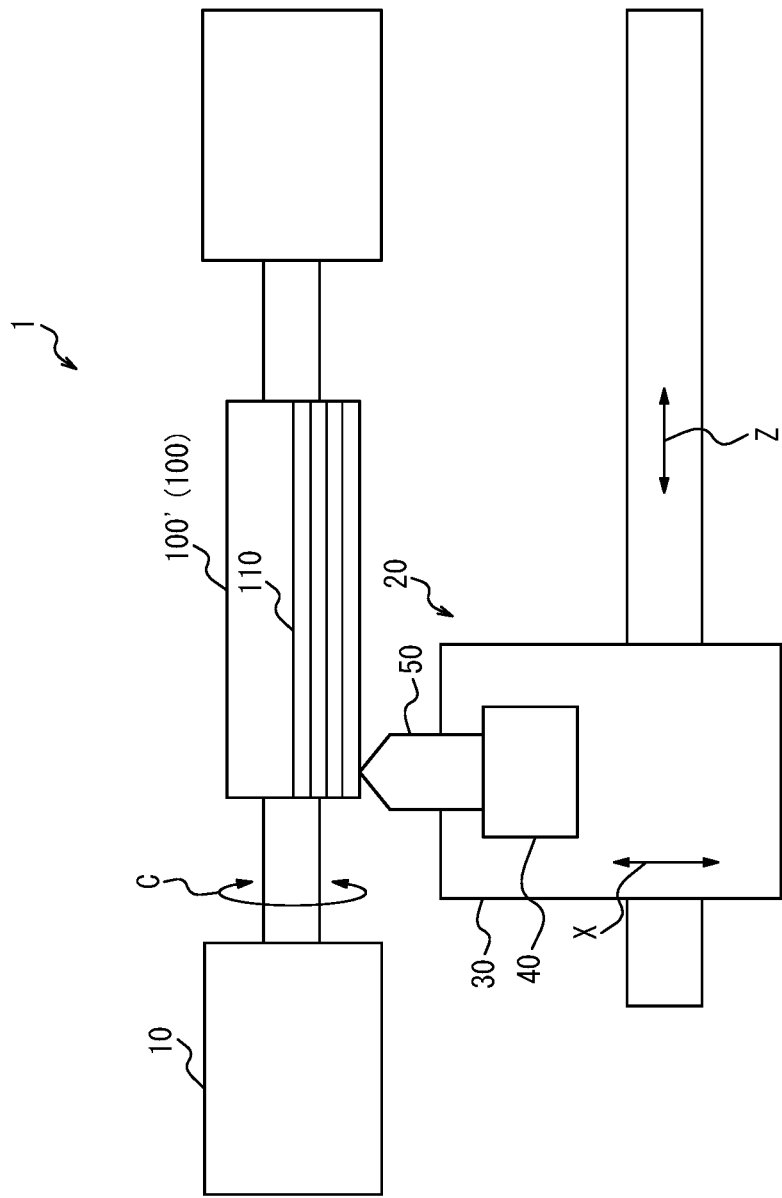

ROLL MOLD AND MANUFACTURING METHOD THEREFOR, AND TRANSFER SHEET

TECHNICAL FIELD

The present disclosure relates to a roll mold and a manufacturing method therefor, and a transfer sheet.

BACKGROUND

Optical films for displays, such as lens films and diffusion films, typically have a fine concavo-convex structure on the surface in order to have a desired function. As a method of manufacturing such an optical film, an imprint technique is known. The imprint technique involves machining the outer peripheral surface of a columnar or cylindrical roll base material to form a fine concavo-convex structure and pressing a roll mold thus obtained against a resin sheet or a resin film to transfer the fine concavo-convex structure on the roll base material. Known examples of the imprint technique include a melt extrusion molding method and a UV transfer method.

As a method of manufacturing a roll mold, a technique of forming a concavo-convex structure on the outer peripheral surface of a roll base material by lithography using laser light, dry etching, and the like is known. This technique, however, requires an expensive laser device or a high-accuracy mask, causing an increase in manufacturing costs. Moreover, since the manufacturing equipment is large, not only the initial costs but also the maintenance costs are high.

An alternative method of manufacturing a roll mold is a technique of forming a concavo-convex structure on the outer peripheral surface of a roll base material by cutting work using a cutting tool. This technique typically uses a cutting tool having a tip (cutting portion) formed at its end to cut a plating layer formed on the surface of a roll base material and made of a nickel phosphorus (Ni—P) plating, a copper (Cu) plating, or the like, and can thus form a concavo-convex structure. By moving the cutting tool relative to the roll base material while rotating the roll base material according to need, the outer peripheral surface of the roll base material can be cut so that portions surrounded by fine depression shapes will be fine protrusion shapes. With this cutting work technique, it is difficult to form an ultrafine concavo-convex structure, but there is the advantage that a roll mold can be produced at relatively low costs.

In the cutting work of the surface of the roll base material, the surface of the roll base material is typically cut linearly to form a groove. By repeatedly performing this linear cutting, a plurality of linear grooves arranged in a certain direction can be formed. There are various directions in which linear grooves are formed, and examples include the circumferential direction (radial direction) of the roll base material, the axial direction (thrust direction) of the roll base material, and a direction (oblique thrust direction) inclined at a certain degree with respect to the axial direction of the roll base material.

Several methods of forming such linear grooves on the surface of a roll base material with high accuracy have been reported. For example, JP 2007-301647 A (PTL 1) discloses a roll lathe capable of grooving not only in the roll circumferential direction but also in the axial direction with high accuracy.

CITATION LIST

Patent Literature

PTL 1: JP 2007-301647 A

SUMMARY

Technical Problem

A typical procedure of cutting work for forming a plurality of linear grooves in the thrust direction or oblique thrust direction of a roll base material is as follows: One linear groove is formed, and then a linear groove is formed in a part adjacent to the first linear groove. This process is repeatedly performed as appropriate to sequentially form a plurality of linear grooves so as to make a round of the circumference of the roll.

However, our study revealed the following: In a roll mold produced by the foregoing procedure, a linear groove formed first and a linear groove formed last are adjacent to each other, and an optical step (for example, difference in reflection characteristics) occurs between these linear grooves. In a resin sheet or a resin film that has undergone transfer using such a roll mold, too, the boundary in optical characteristics between the respective linear protrusions derived from these linear grooves is clearly visible. This problem of the boundary in optical characteristics in the transfer sheet or transfer film is also called "color difference" or "joint", and directly affects the product quality. A technique for avoiding the problem is accordingly needed.

It could therefore be helpful to provide a roll mold that has a plurality of linear grooves arranged side by side on its outer peripheral surface and in which an optical step between adjacent linear grooves is sufficiently small.

It could also be helpful to provide a roll mold manufacturing method that can produce the roll mold easily.

It could also be helpful to provide a transfer sheet that can be produced using the roll mold and in which the boundary in optical characteristics is hardly visible throughout the whole surface.

Solution to Problem

Upon careful examination, we found out the following: The cutting tool wears as the number of linear grooves formed increases, resulting in the difference in shape between the linear groove formed first and the linear groove formed last. This shape difference is caused by the foregoing optical step.

We conducted further examination, and made the following discovery: When forming a plurality of linear grooves in the thrust direction or oblique thrust direction of a roll base material, by optimizing the formation order of the plurality of linear grooves on the roll circumference instead of sequentially forming the plurality of linear grooves so as to make a round of the roll circumference, a roll mold with a reduced optical step between adjacent linear grooves can be obtained easily.

We thus provide the following.

<1> A roll mold comprising, on an outer peripheral surface thereof, n linear grooves extending in a roll axial direction or a direction inclined with respect to the roll axial direction and arranged side by side, where n is 800 or more, wherein the n linear grooves are arranged in a manner that a gradual decrease and a gradual increase in groove depth are repeated, and the number of points at which a transition from the decrease to the increase in groove depth occurs is m or less, where m is selected from 2 to 8.

<2> The roll mold according to <1>, wherein a difference in groove depth between at least one pair of adjacent linear grooves is less than or equal to $(D_{max}-D_{min})/n \times 2m$, where $D_{max}$ is a groove depth of a deepest linear groove and $D_{min}$ is a groove depth of a shallowest linear groove of the n linear grooves.

<3> The roll mold according to <2>, wherein a difference in groove depth between every pair of adjacent linear grooves is less than or equal to $(D_{max}-D_{min})/n \times 2m$.

<4> The roll mold according to any of <1> to <3>, wherein n is 800 or more and 100000 or less.

<5> A manufacturing method for the roll mold according to any of <1> to <4>, the manufacturing method comprising performing a process of forming a linear groove on an outer peripheral surface of a roll base material in a roll axial direction or a direction inclined with respect to the roll axial direction n times, where n is 800 or more, wherein in 1st to mth cutting processes where m is selected from 2 to 8, a total of m linear grooves of 1st to mth linear grooves are formed at respective positions that are made up of a position of 0 degrees and at least one position shifted a multiple of (360/m) degrees from the position of 0 degrees, the position of 0 degrees being any position on the outer peripheral surface of the roll base material, in (m+1)th to (2m)th cutting processes, a total of m linear grooves of (m+1)th to (2m)th linear grooves are formed at respective positions shifted (360/n) degrees from the positions of the 1st to mth linear grooves in a predetermined direction, in (2m+1)th to (3m)th cutting processes, a total of m linear grooves of (2m+1)th to (3m)th linear grooves are formed at respective positions shifted (360/n) degrees from the positions of the 1st to mth linear grooves in a direction opposite to the predetermined direction, in (im+1)th to {(i+1)m}th cutting processes where i is an odd number of 3 or more, a total of m linear grooves of (im+1)th to {(i+1)m}th linear grooves are formed at respective positions shifted (360/n) degrees from positions of {(i−2)m+1}th to {(i−1)m}th linear grooves in the predetermined direction, in (jm+1)th to {(j+1)m}th cutting processes where j is an even number of 4 or more, a total of m linear grooves of (jm+1)th to {(j+1)m}th linear grooves are formed at respective positions shifted (360/n) degrees from positions of {(j−2)m+1}th to {(j−1)m}th linear grooves in the direction opposite to the predetermined direction, and an nth cutting process is a last cutting process.

<6> The manufacturing method according to <5>, wherein n is 800 or more and 100000 or less.

<7> A transfer sheet comprising a plurality of linear protrusions extending and arranged side by side on a surface thereof, wherein the plurality of linear protrusions are arranged in a manner that a gradual decrease and a gradual increase in protrusion height are repeated.

<8> The transfer sheet according to <7>, wherein a difference in protrusion height between at least one pair of adjacent linear protrusions is less than or equal to $(H_{max}-H_{min})/800 \times 2 \times 8$, where $H_{max}$ is a protrusion height of a highest linear protrusion and $H_{min}$ is a protrusion height of a lowest linear protrusion of the plurality of linear protrusions.

<9> The transfer sheet according to <8>, wherein a difference in protrusion height between every pair of adjacent linear protrusions is less than or equal to $(H_{max}-H_{min})/800 \times 2 \times 8$.

Advantageous Effect

It is thus possible to provide a roll mold that has a plurality of linear grooves arranged side by side on its outer peripheral surface and in which an optical step between adjacent linear grooves is sufficiently small.

It is also possible to provide a roll mold manufacturing method that can produce the roll mold easily.

It is also possible to provide a transfer sheet that can be produced using the roll mold and in which the boundary in optical characteristics is hardly visible throughout the whole surface.

BRIEF DESCRIPTION OF THE DRAWINGS

In the accompanying drawings:

FIG. 2 is a diagram illustrating the formation ordinal number of a linear groove at each position in a conventional roll mold having a plurality of linear grooves on its outer peripheral surface;

FIG. 4A is a diagram illustrating the formation ordinal number of a linear groove at each position in a roll mold manufacturing method according to Embodiment 2 of the present disclosure;

FIG. 4B is a diagram plotting the relationship between the formation positions and the formation ordinal numbers of linear grooves in the roll mold manufacturing method according to Embodiment 2 of the present disclosure;

FIG. 4C is a diagram schematically plotting the relationship between the formation positions and the groove depth relative values of linear grooves in the roll mold manufacturing method according to Embodiment 2 of the present disclosure; and FIG. 5 is a schematic diagram illustrating a microfabrication device according to an embodiment that can be used in a roll mold manufacturing method according to the present disclosure.

DETAILED DESCRIPTION

The presently disclosed techniques will be described in detail below by way of embodiments.

(Roll Mold Manufacturing Method)

A roll mold manufacturing method according to one of the disclosed embodiments (hereafter also referred to as "manufacturing method according to this embodiment") is a manufacturing method for a roll mold comprising performing a process of forming a linear groove on an outer peripheral surface of a roll base material in a roll axial direction (thrust direction) or a direction (oblique thrust direction) inclined with respect to the roll axial direction n times, where n is 800 or more, wherein in 1st to mth cutting processes where m is selected from 2 to 8, a total of m linear grooves of 1st to mth linear grooves are formed at respective positions that are made up of a position of 0 degrees (=360 degrees) and at least one position shifted a multiple of (360/m) degrees from the position of 0 degrees, the position of 0 degrees being any position on the outer peripheral surface of the roll base material, in (m+1)th to (2m)th cutting processes, a total of m linear grooves of (m+1)th to (2m)th linear grooves are formed at respective positions shifted (360/n) degrees from the positions of the 1st to mth linear grooves in a predetermined direction, in (2m+1)th to (3m)th cutting processes, a total of m linear grooves of (2m+1)th to (3m)th linear grooves are formed at respective positions shifted (360/n) degrees from the positions of the 1st to mth linear grooves in a direction opposite to the predetermined direction, in (im+1)th to {(i+1)m}th cutting processes where i is an odd number of 3 or more, a total of m linear grooves of (im+1)th to {(i+1)m}th linear grooves are formed at respective positions shifted (360/n) degrees from positions of {(i−2)m+1}th to {(i−1)m}th linear grooves in the predetermined direction, in (jm+1)th to {(j+1)m}th cutting processes where j is an even number of 4 or more, a total of m linear grooves of (jm+1)th to {(j+1)m}th linear grooves are formed at respective positions shifted (360/n) degrees from positions of {(j−2)m+1}th to {(j−1)m}th linear grooves in the direction opposite to the predetermined direction, and an nth cutting process is a last cutting process.

With the manufacturing method according to this embodiment, it is possible to easily manufacture a roll mold in which an optical step between adjacent linear grooves is sufficiently small, in particular the below-described roll mold.

Figure 1:
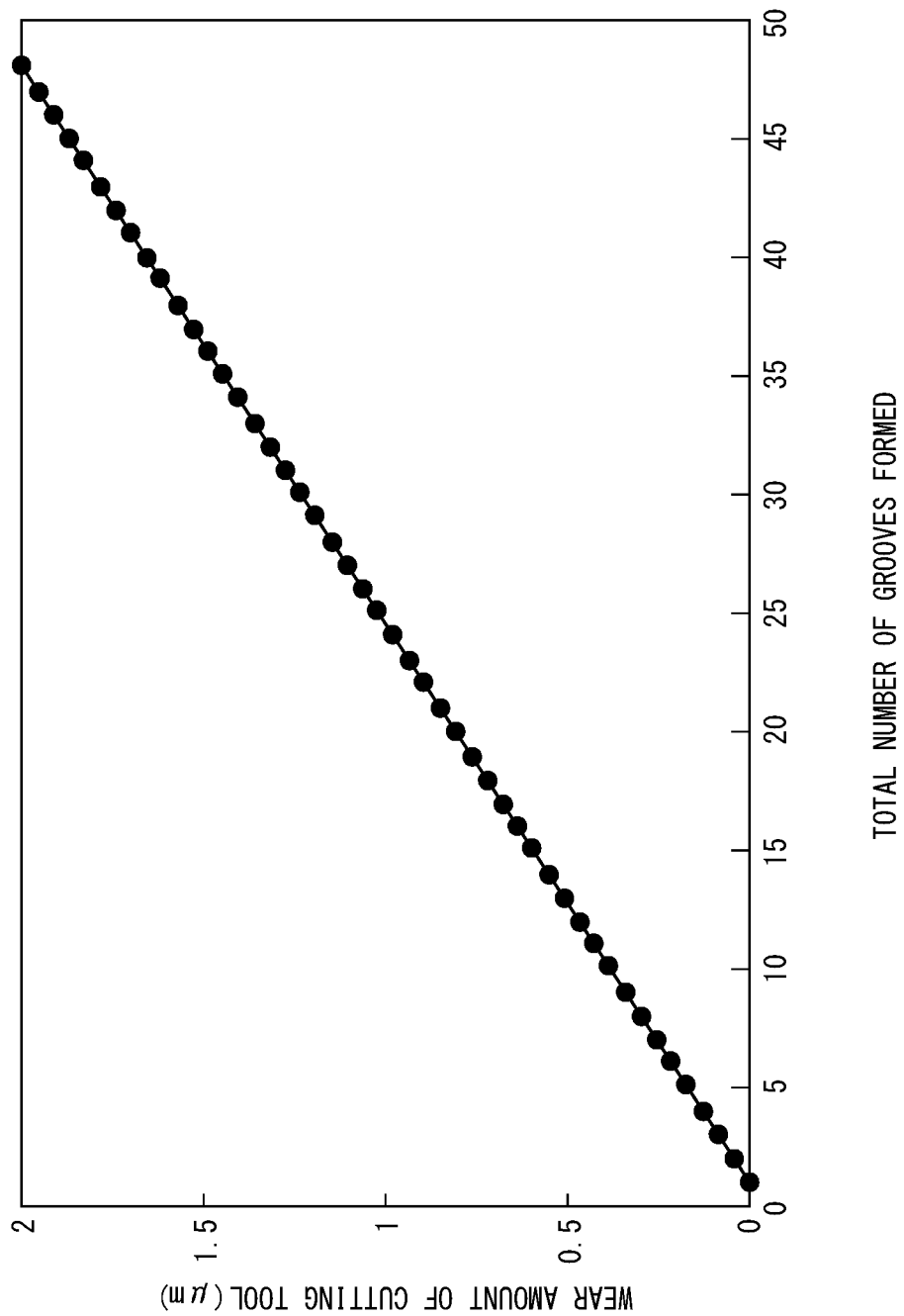
FIG. 1 is a diagram schematically illustrating the relationship between the total number of grooves formed and the wear amount of a cutting tool.

The present disclosure is based on a technical idea that, in the case of repeatedly forming a groove of the same shape using one cutting tool, the wear amount of the cutting tool is substantially proportional to the number of grooves formed. In detail, in the case of forming a plurality of linear grooves of the same shape, the wear amount of the cutting tool tends to increase substantially proportionally to the total number of linear grooves formed, as illustrated in FIG. 1.

For example, consider the case of forming 48 linear grooves (i.e. n=48) on the outer peripheral surface of a roll base material, for convenience of explanation. In the case of sequentially forming the plurality of linear grooves so as to make a round of the roll circumference as in conventional techniques, the formation ordinal number of a linear groove at each position is as illustrated in FIG. 2. In a roll mold 100 obtained in this case, a linear groove 110 formed the 1st time and a linear groove 110 formed the 48th time are adjacent to each other, as illustrated in FIG. 2. Based on the foregoing technical idea, the wear amount of the cutting tool used is different between these two linear grooves 110 (difference of 2 µm with reference to FIG. 1). Consequently, the two linear grooves 110 formed using the cutting tool differ in groove depth by the corresponding amount. Such difference causes an optical step.

In the present disclosure, the formation order of linear grooves on the outer peripheral surface of the roll base material is optimized so as to effectively reduce the optical step, in view of the foregoing technical idea about the proportional relationship. The manufacturing method according to this embodiment will be described in detail below.

In the manufacturing method according to this embodiment, the number n of linear grooves formed is 800 or more. In the following description, however, the number n of linear grooves formed is assumed to be 48 for convenience of explanation. It should be obvious for a person skilled in the art that the following description also applies to the case where 800≤n throughout this specification.

In the manufacturing method according to this embodiment, m is also referred to as "number of points of origin", and is an integer selected from 2 to 8.

An example in which m=2 will be described below, with reference to FIG. 3A, FIG. 3B, and FIG. 3C. In the following description, m cutting processes are referred to as "1 turn" for convenience of explanation.

In the 1st to 2nd cutting processes (1st turn), a total of two linear grooves 110 of the 1st to 2nd linear grooves 110 are formed at a position of 0 degrees (=360 degrees) and a position shifted 180 (=360/2) degrees from the position of 0 degrees, that is, a position opposite to the position of 0 degrees with respect to the center of the circle, where the position of 0 degrees is any position on the outer peripheral surface of the roll base material.

Figure 3A:
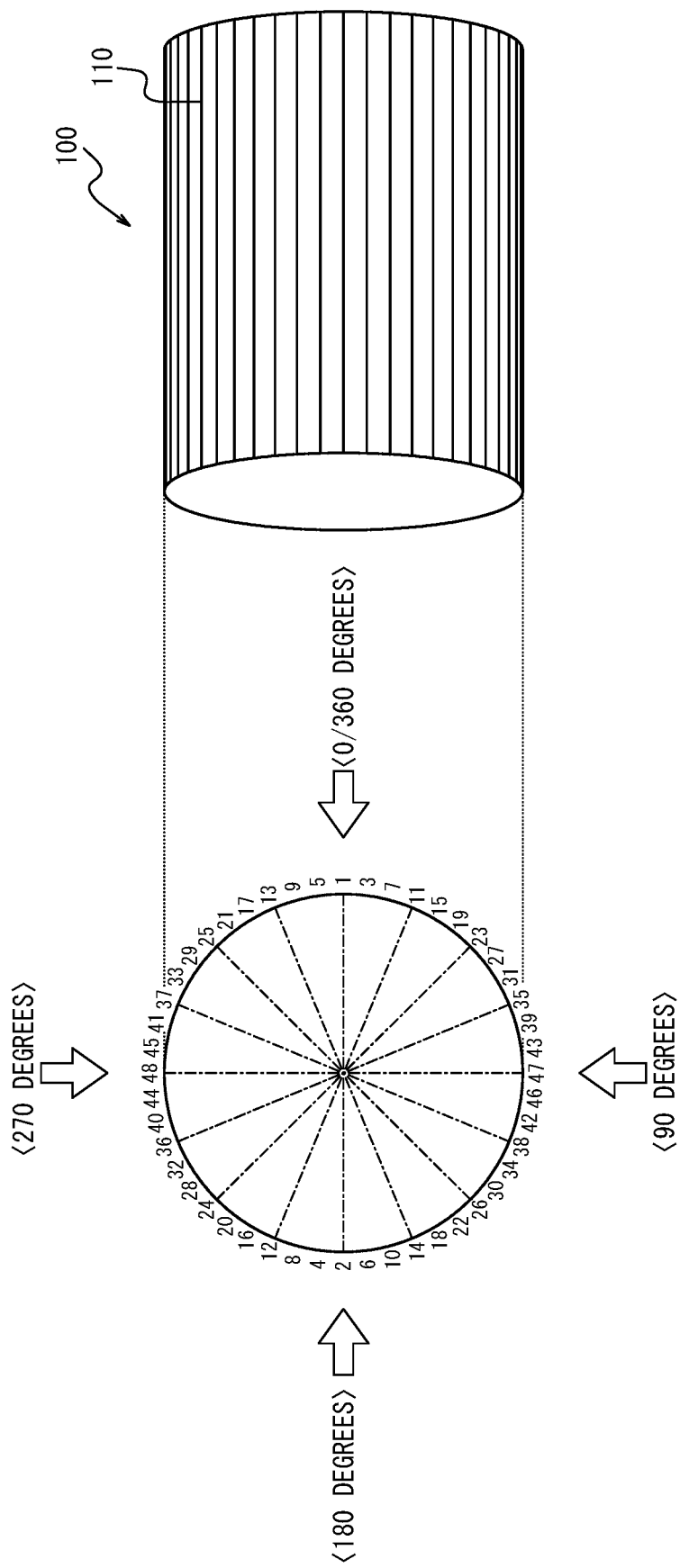
FIG. 3A is a diagram illustrating the formation ordinal number of a linear groove at each position in a roll mold manufacturing method according to Embodiment 1 of the present disclosure.
Figure 3B:
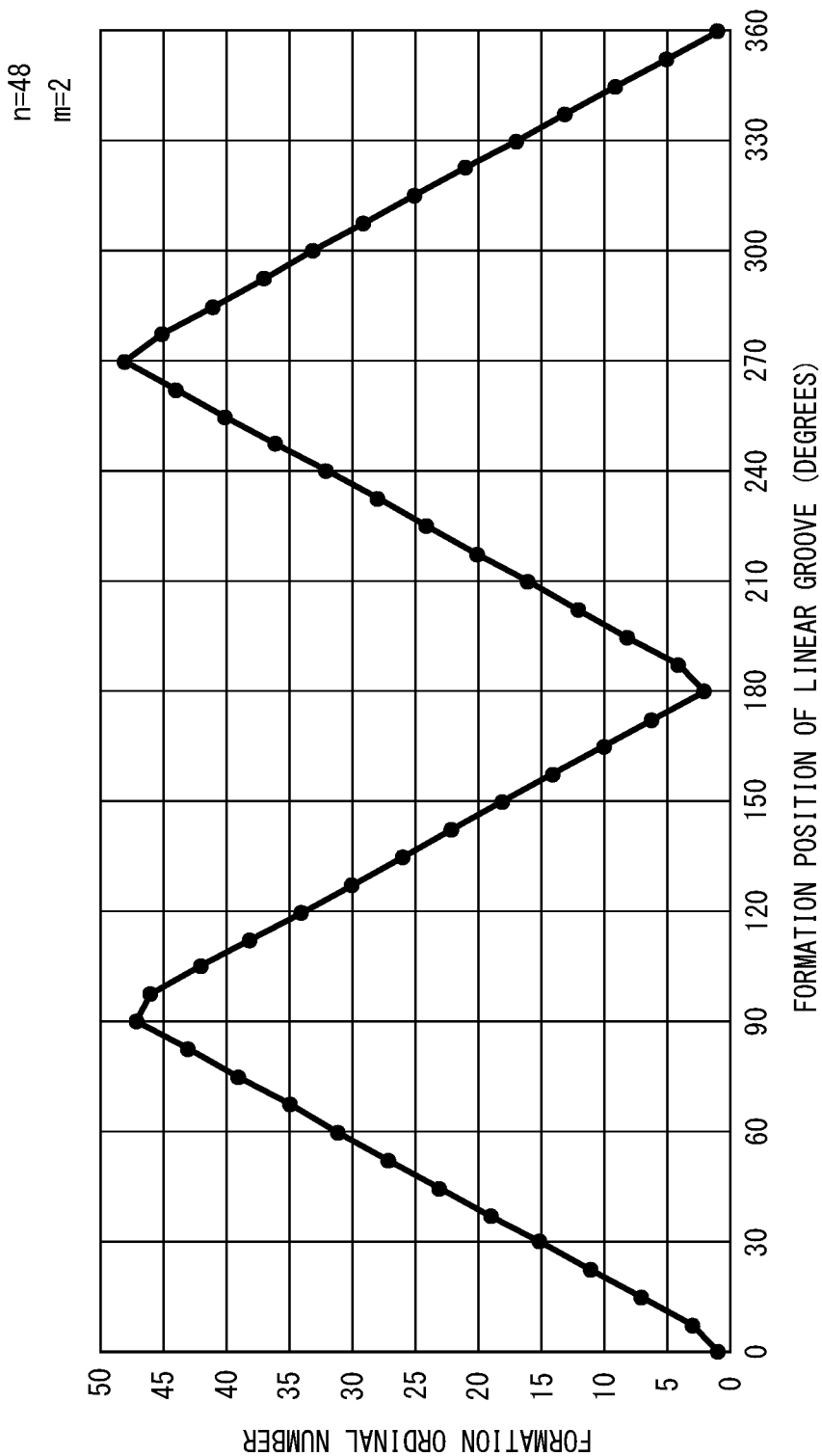
FIG. 3B is a diagram plotting the relationship between the formation positions and the formation ordinal numbers of linear grooves in the roll mold manufacturing method according to Embodiment 1 of the present disclosure.
Figure 3C:
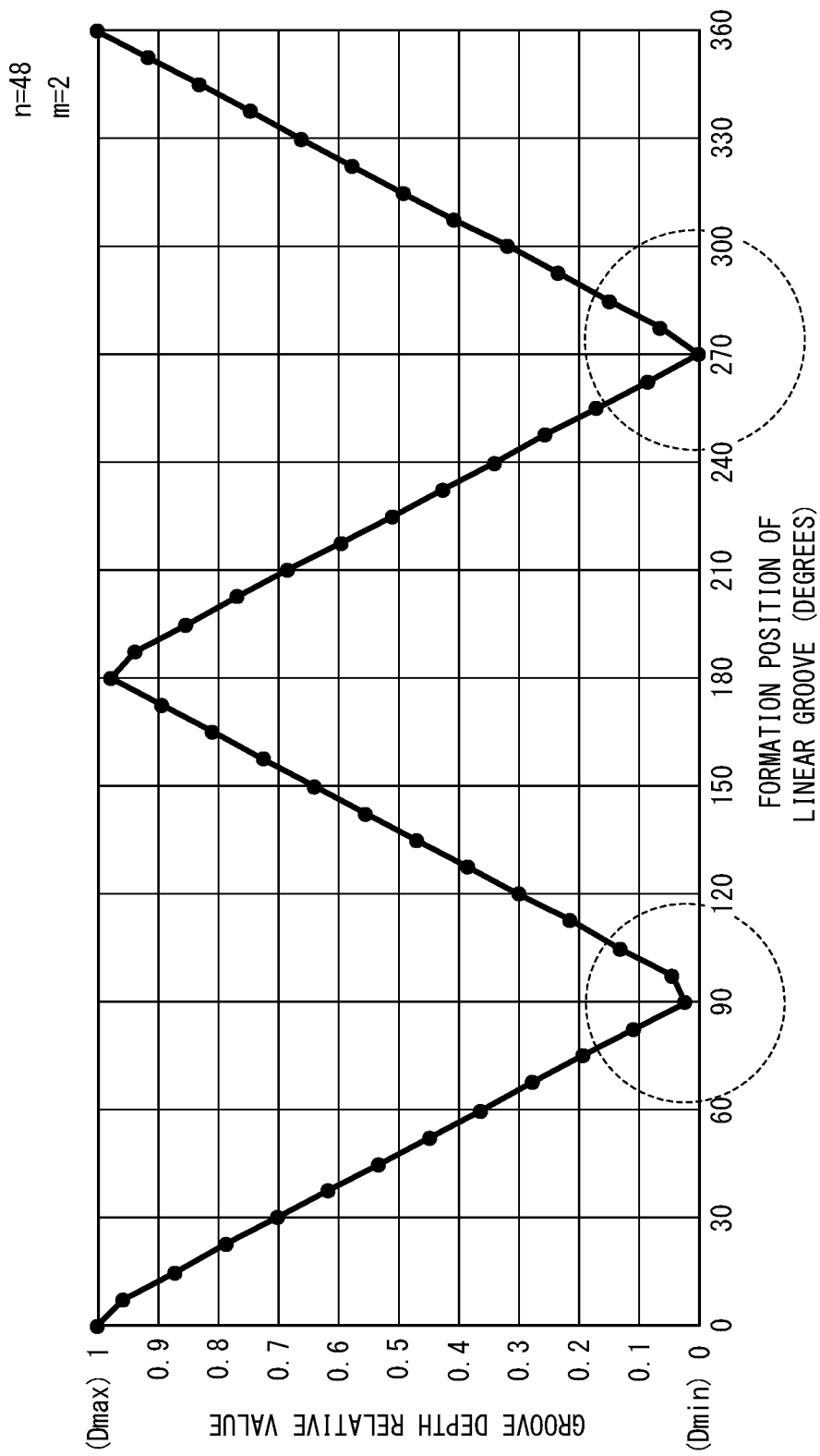
FIG. 3C is a diagram schematically plotting the relationship between the formation positions and the groove depth relative values of linear grooves in the roll mold manufacturing method according to Embodiment 1 of the present disclosure.

Next, in the 3rd to 4th cutting processes (2nd turn), a total of two linear grooves 110 of the 3rd to 4th linear grooves 110 are formed at respective positions shifted 7.5 (=360/48) degrees from the positions of the 1st to 2nd linear grooves 110 in a predetermined direction (for example, the clockwise direction of the circle defining the cross section in FIG. 3A), i.e. positions of 7.5 degrees and 187.5 degrees.

Next, in the 5th to 6th cutting processes (3rd turn), a total of two linear grooves 110 of the 5th to 6th linear grooves 110 are formed at respective positions shifted 7.5 (=360/48) degrees from the positions of the 1st to 2nd linear grooves 110 in a direction (for example, the counterclockwise direction of the circle defining the cross section in FIG. 3A) opposite to the predetermined direction, i.e. positions of 352.5 degrees and 172.5 degrees.

Next, in the 7th to 8th cutting processes (4th turn), a total of two linear grooves 110 of the 7th to 8th linear grooves 110 are formed at respective positions shifted 7.5 (=360/48) degrees from the positions of the 3rd to 4th linear grooves 110 in the predetermined direction, i.e. positions of 15 degrees and 195 degrees.

Next, in the 9th to 10th cutting processes (5th turn), a total of two linear grooves 110 of the 9th to 10th linear grooves 110 are formed at respective positions shifted 7.5 (=360/48) degrees from the positions of the 5th to 6th linear grooves 110 in the direction opposite to the predetermined direction, i.e. positions of 345 degrees and 165 degrees.

In each subsequent turn, the cutting processes are repeated in the same manner as two turns ago. More specifically, in each of the 11th to 12th cutting processes (6th turn), the 15th to 16th cutting processes (8th turn), the 19th to 20th cutting processes (10th turn), . . . , a total of two linear grooves 110 are formed at respective positions shifted 7.5 (=360/48) degrees from the positions of the linear grooves 110 formed two turns ago in the predetermined direction. In each of the 13th to 14th cutting processes (7th turn), the 17th to 18th cutting processes (9th turn), the 21st to 22nd cutting processes (11th turn), . . . , a total of two linear grooves 110 are formed at respective positions shifted 7.5 (=360/48) degrees from the positions of the linear grooves 110 formed two turns ago in the direction opposite to the predetermined direction.

After the 48th cutting process, the cutting ends.

FIG. 3A is a diagram illustrating the formation ordinal number of the linear groove 110 at each position in the roll mold 100 obtained in this way. FIG. 3B is a diagram plotting the relationship between the formation positions and the formation ordinal numbers of the linear grooves 110 in the roll mold 100. As illustrated in FIG. 3A and FIG. 3B, in the roll mold 100, the difference in formation ordinal number between adjacent two linear grooves 110 can be limited to less than 6 (=3m), specifically 4 (=2m) or less. FIG. 3C is a diagram schematically plotting the relationship between the formation positions and the groove depth relative values of the linear grooves 110, based on the foregoing technical idea that the number of grooves formed and the wear amount of the cutting tool are in the proportional relationship. In FIG. 3C, $D_{max}$ is the groove depth of the deepest linear groove 110, and $D_{min}$ is the groove depth of the shallowest linear groove 110. As illustrated in FIG. 3C, in the roll mold 100, 48 (=n) linear grooves are arranged in such a manner that a gradual decrease and a gradual increase in groove depth are repeated, and the number of points at which a transition from the decrease to the increase in groove depth occurs (which is equal to the number of points at which a transition from the increase to the decrease in groove depth occurs) is 2 (=m). With such a feature, the optical step between adjacent linear grooves is sufficiently reduced in the roll mold 100.

An example in which m=4 will be described below, with reference to FIG. 4A, FIG. 4B, and FIG. 4C.

In the 1st to 4th cutting processes (1st turn), a total of four linear grooves 110 of the 1st to 4th linear grooves 110 are formed at a position of 0 degrees (=360 degrees) and respective positions shifted multiples of 90 (=360/4) degrees from the position of 0 degrees, i.e. positions of 90 degrees, 180 degrees, and 270 degrees, where the position of 0 degrees is any position on the outer peripheral surface of the roll base material.

In the 1st to 4th cutting processes (1st turn), for example, the 1st to 4th linear grooves 110 may be formed respectively at a position of 0 degrees, a position of 180 degrees, a position of 90 degrees, and a position of 270 degrees, without being limited thereto. Alternatively, the 1st to 4th linear grooves 110 may be formed respectively at a position of 0 degrees, a position of 90 degrees, a position of 180 degrees, and a position of 270 degrees.

Next, in the 5th to 8th cutting processes (2nd turn), a total of four linear grooves 110 of the 5th to 8th linear grooves 110 are formed at respective positions shifted 7.5 (=360/48) degrees from the positions of the 1st to 4th linear grooves 110 in a predetermined direction (for example, the clockwise direction of the circle defining the cross section in FIG. 4A), i.e. positions of 7.5 degrees, 97.5 degrees, 187.5 degrees, and 277.5 degrees.

Next, in the 9th to 12th cutting processes (3rd turn), a total of four linear grooves 110 of the 9th to 12th linear grooves 110 are formed at respective positions shifted 7.5 (=360/48) degrees from the positions of the 1st to 4th linear grooves 110 in a direction (for example, the counterclockwise direction of the circle defining the cross section in FIG. 4A) opposite to the predetermined direction, i.e. positions of 352.5 degrees, 82.5 degrees, 172.5 degrees, and 262.5 degrees.

Next, in the 13th to 16th cutting processes (4th turn), a total of four linear grooves 110 of the 13th to 16th linear grooves 110 are formed at respective positions shifted 7.5 (=360/48) degrees from the positions of the 5th to 8th linear grooves 110 in the predetermined direction, i.e. positions of 15 degrees, 105 degrees, 195 degrees, and 285 degrees.

Next, in the 17th to 20th cutting processes (5th turn), a total of four linear grooves 110 of the 17th to 20th linear grooves 110 are formed at respective positions shifted 7.5 (=360/48) degrees from the positions of the 9th to 12th linear grooves 110 in the direction opposite to the predetermined direction, i.e. positions of 345 degrees, 75 degrees, 165 degrees, and 255 degrees.

In each subsequent turn, the cutting processes are repeated in the same manner as two turns ago. More specifically, in each of the 21st to 24th cutting processes (6th turn), the 29th to 32nd cutting processes (8th turn), the 37th to 40th cutting processes (10th turn), . . . , a total of four linear grooves 110 are formed at respective positions shifted 7.5 (=360/48) degrees from the positions of the linear grooves 110 formed two turns ago in the predetermined direction. In each of the 25th to 28th cutting processes (7th turn), the 33rd to 36th cutting processes (9th turn), the 41st to 44th cutting processes (11th turn), . . . , a total of four linear grooves 110 are formed at respective positions shifted 7.5 (=360/48) degrees from the positions of the linear grooves 110 formed two turns ago in the direction opposite to the predetermined direction.

After the 48th cutting process, the cutting ends.

FIG. 4A is a diagram illustrating the formation ordinal number of the linear groove 110 at each position in the roll mold 100 obtained in this way. FIG. 4B is a diagram plotting the relationship between the formation positions and the formation ordinal numbers of the linear grooves 110 in the roll mold 100. As illustrated in FIG. 4A and FIG. 4B, in the roll mold 100, the difference in formation ordinal number between adjacent two linear grooves 110 can be limited to less than 12 (=3m), specifically 8 (=2m) or less. FIG. 4C is a diagram schematically plotting the relationship between the formation positions and the groove depth relative values of the linear grooves 110, based on the foregoing technical idea that the number of grooves formed and the wear amount of the cutting tool are in the proportional relationship. In FIG. 4C, $D_{max}$ is the groove depth of the deepest linear groove 110, and $D_{min}$ is the groove depth of the shallowest linear groove 110. As illustrated in FIG. 4C, in the roll mold 100, 48 (=n) linear grooves are arranged in such a manner that a gradual decrease and a gradual increase in groove depth are repeated, and the number of points at which a transition from the decrease to the increase in groove depth occurs (which is equal to the number of points at which a transition from the increase to the decrease in groove depth occurs) is 4 (=m). With such a feature, the optical step between adjacent linear grooves is sufficiently reduced in the roll mold 100.

In the case where it is assumed that the number of linear grooves formed and the wear amount of the cutting tool are in the proportional relationship as mentioned above, it can be considered that the number of linear grooves formed and the groove depth are in the proportional relationship correspondingly. In this case, it can be assumed that the groove depth decreases by $(D_{max}-D_{min})/n$ each time a groove is formed, where $D_{max}$ is the groove depth of the deepest linear groove and $D_{min}$ is the groove depth of the shallowest linear groove of the n linear grooves. This being so, if the difference in formation ordinal number between adjacent two linear grooves is less than 3m, specifically 2m or less as mentioned above, the difference in groove depth between adjacent two linear grooves can be estimated to be less than $(D_{max}-D_{min})/n \times 3m$, specifically less than or equal to $(D_{max}-D_{min})/n \times 2m$.

In the manufacturing method according to this embodiment, the formation order of m linear grooves in each turn preferably matches the formation order of the 1st to mth linear grooves in the 1st turn as the basis of linear grooves, without being limited thereto. For example, in the case where m=2, it is preferable to, in each turn, form a linear groove (3rd, 5th, 7th, etc.) derived from the 1st linear groove and then form a linear groove (4th, 6th, 8th, etc.) derived from the 2nd linear groove. For example, in the case where m=4, it is preferable to, in each turn, form a linear groove (5th, 9th, 13th, etc.) derived from the 1st linear groove, then form a linear groove (6th, 10th, 14th, etc.) derived from the 2nd linear groove, then form a linear groove (7th, 11th, 15th, etc.) derived from the 3rd linear groove, and then form a linear groove (8th, 12th, 16th, etc.) derived from the 4th linear groove.

In the manufacturing method according to this embodiment, m is an integer selected from 2 to 8. That is, m is 2, 3, 4, 5, 6, 7, or 8. In particular, m is preferably 2, 3, or 4, and more preferably 2 or 4, from the viewpoint of reducing the optical step in the roll mold more easily and effectively.

In the manufacturing method according to this embodiment, n is 800 or more. In particular, n is preferably 800 or more and 100000 or less, from the viewpoint of reducing the optical step in the roll mold more effectively.

Moreover, m is preferably an integer divisible by n, without being limited thereto. In other words, n is preferably a multiple of m.

Although the linear grooves 110 are formed in the roll axial direction (thrust direction) in FIG. 3A and FIG. 4A, the present disclosure is not limited to such, and the linear grooves 110 may be formed in a direction (oblique thrust direction) inclined at a predetermined angle with respect to the roll axial direction.

In the manufacturing method according to this embodiment, the n linear grooves are preferably formed at a predetermined pitch with equal intervals, although a certain degree of pitch error is allowable.

For example, the manufacturing method according to this embodiment can be carried out using a device illustrated in FIG. 5, without being limited thereto. A microfabrication device 1 illustrated in FIG. 5 is a device that cuts the surface of a roll base material 100' to form a plurality of linear grooves 110 on the outer peripheral surface of the roll base material 100'. A roll mold 100 can thus be manufactured.

The roll base material 100' is columnar or cylindrical. As the material of the roll base material 100', an iron-based material such as S45C or SUS304 is typically used. The roll base material 100' may include a circuit for cooling the roll base material 100'.

The roll base material 100' may have a plating layer on the surface. In this case, the linear grooves 110 are formed in the plating layer. Examples of the material of the plating layer include nickel phosphorus (Ni—P) and copper (Cu).

In the microfabrication device 1, the roll base material 100' is attached to a rotation device 10 so as to be rotatable in the C-axis direction with the central axis as the rotation axis. The rotation device 10 controls the rotation angle and the rotation speed of the roll base material 100'.

The microfabrication device 1 includes a cutting device 20. The cutting device 20 includes a machining stage 30 (tool moving portion), a tool installation portion 40 provided in the machining stage 30, and a cutting tool 50 provided in the tool installation portion 40. The machining stage 30 is movable in the Z-axis direction which is parallel to the rotation axis of the rotation device 10 (i.e. the axial direction of the roll base material 100'). The machining stage 30 is also movable in the X-axis direction which is parallel to the radial direction of the roll base material 100'. Thus, the cutting tool 50 can be moved in the Z-axis direction and the X-axis direction by the machining stage 30. By appropriately moving the cutting tool 50, the surface of the roll base material 100' can be cut.

Examples of the material of the cutting tool 50 include diamond, cemented carbide, high-speed tool steel, and cubic boron nitride (CBN). The cutting tool 50 can be produced by polishing any of these materials. The cutting tool 50 can also be produced by laser irradiation, ion milling, or the like.

The tip of the cutting tool 50 may have a tapered shape. The tip of the cutting tool 50 is pressed against the roll base material 100' to cut the surface of the roll base material 100'. The shape of the linear groove 110 formed in the roll base material 100' corresponds to the shape of the tip of the cutting tool 50.

For example, in the case of forming the linear groove 110 in the axial direction (thrust direction) of the roll base material 100', the cutting tool 50 is brought into contact with the roll base material 100' and moved in the Z-axis direction in a state in which the rotation of the roll base material 100' by the rotation device 10 is stopped. For example, in the case of forming the linear groove 110 in a direction (oblique thrust direction) inclined with respect to the axial direction of the roll base material 100', the cutting tool 50 is brought into contact with the roll base material 100' and moved in the Z-axis direction while rotating the roll base material 100' by the rotation device 10.

In each cutting process, the cutting starts after the roll base material 100' is rotated so as to come into contact with the cutting tool at a predetermined position by the manufacturing method according to this embodiment.

The microfabrication device 1 may include a controller that controls the rotation angle and the rotation speed of the rotation device 10, the moving pattern of the machining stage 30 (cutting tool 50), and the like in combination in order to carry out the manufacturing method according to this embodiment.

(Roll Mold)

A roll mold according to one of the disclosed embodiments (hereafter also referred to as "roll mold according to this embodiment") is a roll mold comprising, on an outer peripheral surface thereof, n linear grooves extending in a roll axial direction or a direction inclined with respect to the roll axial direction and arranged side by side, where n is 800 or more, wherein the n linear grooves are arranged in a manner that a gradual decrease and a gradual increase in groove depth are repeated, and the number of points at which a transition from the decrease to the increase in groove depth occurs is m or less, where m is selected from 2 to 8.

Since the roll mold according to this embodiment has the foregoing structure, the optical step between adjacent linear grooves is sufficiently small. By using such a roll mold according to this embodiment, a transfer sheet in which the boundary in optical characteristics is hardly visible throughout the whole surface can be obtained. The roll mold according to this embodiment also has the advantage that it can be produced using one cutting tool.

For example, the roll mold according to this embodiment can be manufactured by the foregoing manufacturing method according to this embodiment. The roll mold according to this embodiment may be manufactured by a method other than the manufacturing method according to this embodiment, for example, by appropriately changing the formation order in the manufacturing method according to this embodiment. The roll mold according to this embodiment can be obtained, for example, even in the case where the 8th linear groove and the 10th linear groove in the linear groove formation order illustrated in FIG. 3A (m=2, n=48) are replaced with each other. The roll mold according to this embodiment can be obtained, for example, even in the case where the 7th linear groove, the 8th linear groove, the 9th linear groove, and the 10th linear groove in the linear groove formation order illustrated in FIG. 3A (m=2, n=48) are randomly replaced with one another.

In the roll mold according to this embodiment, the difference in groove depth between at least one pair of adjacent linear grooves is preferably less than or equal to $(D_{max}-D_{min})/n \times 2m$, where $D_{max}$ is the groove depth of the deepest linear groove and $D_{min}$ is the groove depth of the shallowest linear groove. In such a case, the optical step in the roll mold is further reduced. From the same viewpoint, it is more preferable that, in the roll mold according to this embodiment, the difference in groove depth between every pair of adjacent linear grooves is less than or equal to $(D_{max}-D_{min})/n \times 2m$.

This condition that the difference in groove depth is "less than or equal to $(D_{max}-D_{min})/n \times 2m$" is based on the above-described study results on the roll mold manufacturing method.

In the roll mold according to this embodiment, the n linear grooves are preferably arranged at a predetermined pitch with equal intervals, although a certain degree of pitch error is allowable.

The groove depth of each linear groove can be measured by forming a linear protrusion corresponding to the linear groove on a resin by transfer and observing a cross section of the linear protrusion using an optical microscope such as a laser microscope or an electron microscope such as a scanning electron microscope (SEM). Herein, the "groove depth of the linear groove" in the roll mold according to this embodiment is the average value of three groove depths at one end of the linear groove, the other end of the linear groove, and a middle part between the two ends.

In the roll mold according to this embodiment, m is an integer selected from 2 to 8. That is, m is 2, 3, 4, 5, 6, 7, or 8. In particular, m is preferably 2, 3, or 4, and more preferably 2 or 4, from the viewpoint of reducing the optical step in the roll mold more easily and effectively.

In the roll mold according to this embodiment, n is 800 or more. In particular, n is preferably 800 or more and 100000 or less, from the viewpoint of reducing the optical step in the roll mold more effectively.

The diameter of the roll mold according to this embodiment is not limited, and may be, for example, 130 mm or more and 1000 mm or less. The pitch of the linear grooves in the roll mold according to this embodiment is not limited, and may be, for example, 30 μm or more and 500 μm or less.

(Transfer Sheet)

A transfer sheet according to one of the disclosed embodiment (hereafter also referred to as "transfer sheet according to this embodiment") is a transfer sheet comprising a plurality of linear protrusions extending and arranged side by side on a surface thereof, wherein the plurality of linear protrusions are arranged in a manner that a gradual decrease and a gradual increase in protrusion height are repeated.

Since the transfer sheet according to this embodiment has the foregoing structure, the boundary in optical characteristics is hardly visible throughout the whole surface. Hence, even in the case of obtaining such a transfer sheet by continuous molding, the transfer sheet can be extracted from any position as an optical film product for a large display or the like.

In the transfer sheet according to this embodiment, the difference in protrusion height between at least one pair of adjacent linear protrusions is preferably less than or equal to $(H_{max}-H_{min})/800 \times 2 \times 8$, where $H_{max}$ is the protrusion height of the highest linear protrusion and $H_{min}$ is the protrusion height of the lowest linear protrusion. In this case, the boundary in optical characteristics is even less visible in the transfer sheet. From the same viewpoint, it is more preferable that, in the transfer sheet according to this embodiment, the difference in protrusion height between every pair of adjacent linear protrusions is less than or equal to $(H_{max}-H_{min})/800 \times 2 \times 8$.

This condition that the difference in protrusion height is "less than or equal to $(H_{max}-H_{min})/800 \times 2 \times 8$" is based on the above-described study results on the roll mold manufacturing method. Especially, "800" derives from the minimum value of n, and "8" derives from the maximum value of m. In the transfer sheet according to this embodiment, the difference in protrusion height between every pair of adjacent linear protrusions is even more preferably less than or equal to $(H_{max}-H_{min})/5000 \times 2 \times 8$, further preferably less than or equal to $(H_{max}-H_{min})/10000 \times 2 \times 8$, and particularly preferably less than or equal to $(H_{max}-H_{min})/30000 \times 2 \times 8$.

The protrusion height of each linear protrusion can be measured by observing a cross section of the linear protrusion using an optical microscope such as a laser microscope or an electron microscope such as a scanning electron microscope (SEM). Herein, the "protrusion height of the linear protrusion" in the transfer sheet according to this embodiment is the average value of three protrusion heights at one end of the linear protrusion, the other end of the linear protrusion, and a middle end between the two ends.

The pitch of the plurality of linear protrusions in the transfer sheet according to this embodiment is not limited, and may be, for example, 30 μm or more and 500 μm or less.

The transfer sheet according to this embodiment is preferably a sheet made of a resin (resin sheet). The transfer sheet according to this embodiment may be manufactured, for example, by transferring the surface shape of the foregoing roll mold according to this embodiment to a resin (shape transfer method), without being limited thereto.

Examples of the resin include ultraviolet curable resins such as acrylic resin. The resin may be optionally blended with a filler, a functional additive, an inorganic material, a pigment, an antistatic agent, a sensitizing dye, and the like as appropriate.

The transfer sheet according to this embodiment is, for example, suitable as an optical film for a display, such as a lens film or a diffusion film.

INDUSTRIAL APPLICABILITY

It is thus possible to provide a roll mold that has a plurality of linear grooves arranged side by side on its outer peripheral surface and in which an optical step between adjacent linear grooves is sufficiently small.

It is also possible to provide a roll mold manufacturing method that can produce the roll mold easily.

It is also possible to provide a transfer sheet that can be produced using the roll mold and in which the boundary in optical characteristics is hardly visible throughout the whole surface.

REFERENCE SIGNS LIST 1 microfabrication device
10 rotation device 20 cutting device
30 machining stage
40 tool installation portion
50 cutting tool
100' roll base material
100 roll mold
110 linear groove

The invention claimed is:

1. A roll mold comprising, on an outer peripheral surface thereof, n linear grooves extending in a roll axial direction or a direction inclined with respect to the roll axial direction and arranged side by side, where n is 800 or more,
wherein the n linear grooves are arranged in a manner that a gradual decrease and a gradual increase in groove depth are repeated, and the number of points at which a transition from the decrease to the increase in groove depth occurs is m or less, where m is selected from 2 to 8.

2. The roll mold according to claim 1, wherein a difference in groove depth between at least one pair of adjacent linear grooves is less than or equal to $(D_{max}-D_{min})/n \times 2m$, where $D_{max}$ is a groove depth of a deepest linear groove and $D_{min}$ is a groove depth of a shallowest linear groove of the n linear grooves.

3. The roll mold according to claim 2, wherein a difference in groove depth between every pair of adjacent linear grooves is less than or equal to $(D_{max}-D_{min})/n \times 2m$.

4. The roll mold according to claim 1, wherein n is 800 or more and 100000 or less.

* * * * *